(12) United States Patent
Koganezawa et al.

(10) Patent No.: US 7,527,413 B2
(45) Date of Patent: May 5, 2009

(54) LIQUID CRYSTAL DISPLAY DEVICE

(75) Inventors: Nobuyuki Koganezawa, Mobara (JP); Akio Tezuka, Mobara (JP); Fumiyuki Sato, Mobara (JP)

(73) Assignees: Hitachi Displays, Ltd., Mobara-Shi (JP); Hitachi Displays Devices, Ltd., Mobara-shi (JP)

( * ) Notice: Subject to any disclaimer, the term of this patent is extended or adjusted under 35 U.S.C. 154(b) by 0 days.

(21) Appl. No.: 11/138,375

(22) Filed: May 27, 2005

(65) Prior Publication Data

US 2006/0013016 A1    Jan. 19, 2006

(30) Foreign Application Priority Data

May 28, 2004    (JP) .............................. 2004-159611

(51) Int. Cl.
    *H01R 33/00* (2006.01)
(52) U.S. Cl. .................... 362/620; 362/330; 349/64
(58) Field of Classification Search ................ 362/330; 349/61–64
    See application file for complete search history.

(56) References Cited

U.S. PATENT DOCUMENTS 5,128,783 A * 7/1992 Abileah et al. .............. 349/162
5,161,041 A * 11/1992 Abileah et al. .............. 349/62
7,063,448 B2 * 6/2006 Kang et al. .................. 362/558

FOREIGN PATENT DOCUMENTS

JP    06-273763    9/1994
JP    2004-031312    1/2004

* cited by examiner

*Primary Examiner*—Sandra L O'Shea
*Assistant Examiner*—Jason Moon Han
(74) *Attorney, Agent, or Firm*—Antonelli, Terry, Stout & Kraus, LLP.

(57) ABSTRACT

A liquid crystal display device has a liquid crystal display panel and a backlight. The backlight includes plural line light sources arranged in parallel with each other, a transparent optical plate disposed on a liquid-crystal-display-panel side of the line light sources, plural minute optical controlling elements formed on a liquid-crystal-display-panel-side surface of the transparent optical plate. The plural minute optical controlling elements extend in parallel with the line light sources, and are symmetrical in a cross section perpendicular to longitudinal axes of the plural line sources, between two adjacent midplanes each of which passes midway between two adjacent ones of the plural line light sources and each of which is perpendicular to the transparent optical plate.

11 Claims, 16 Drawing Sheets

FIG. 4A
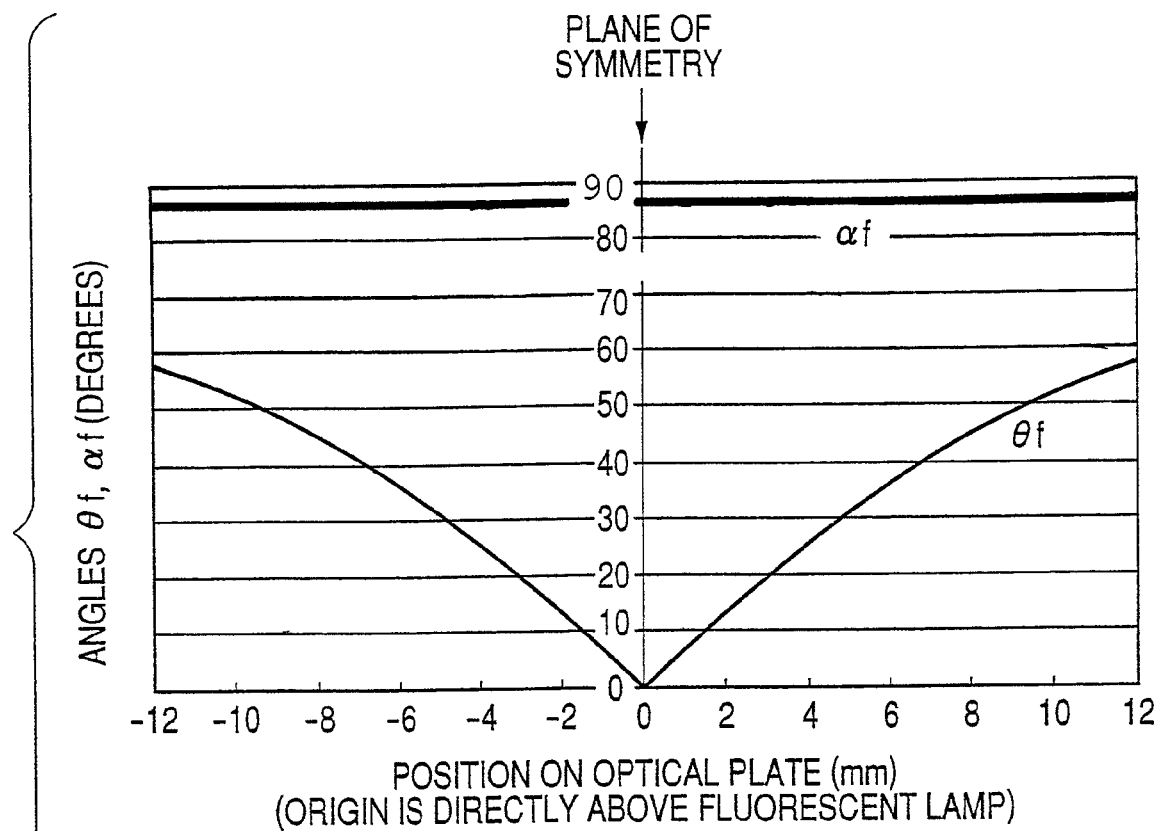
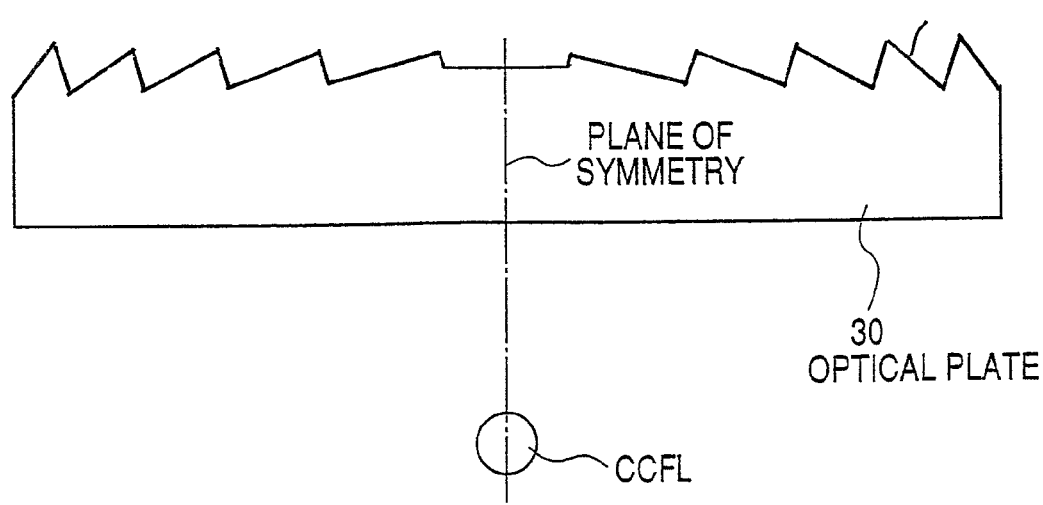

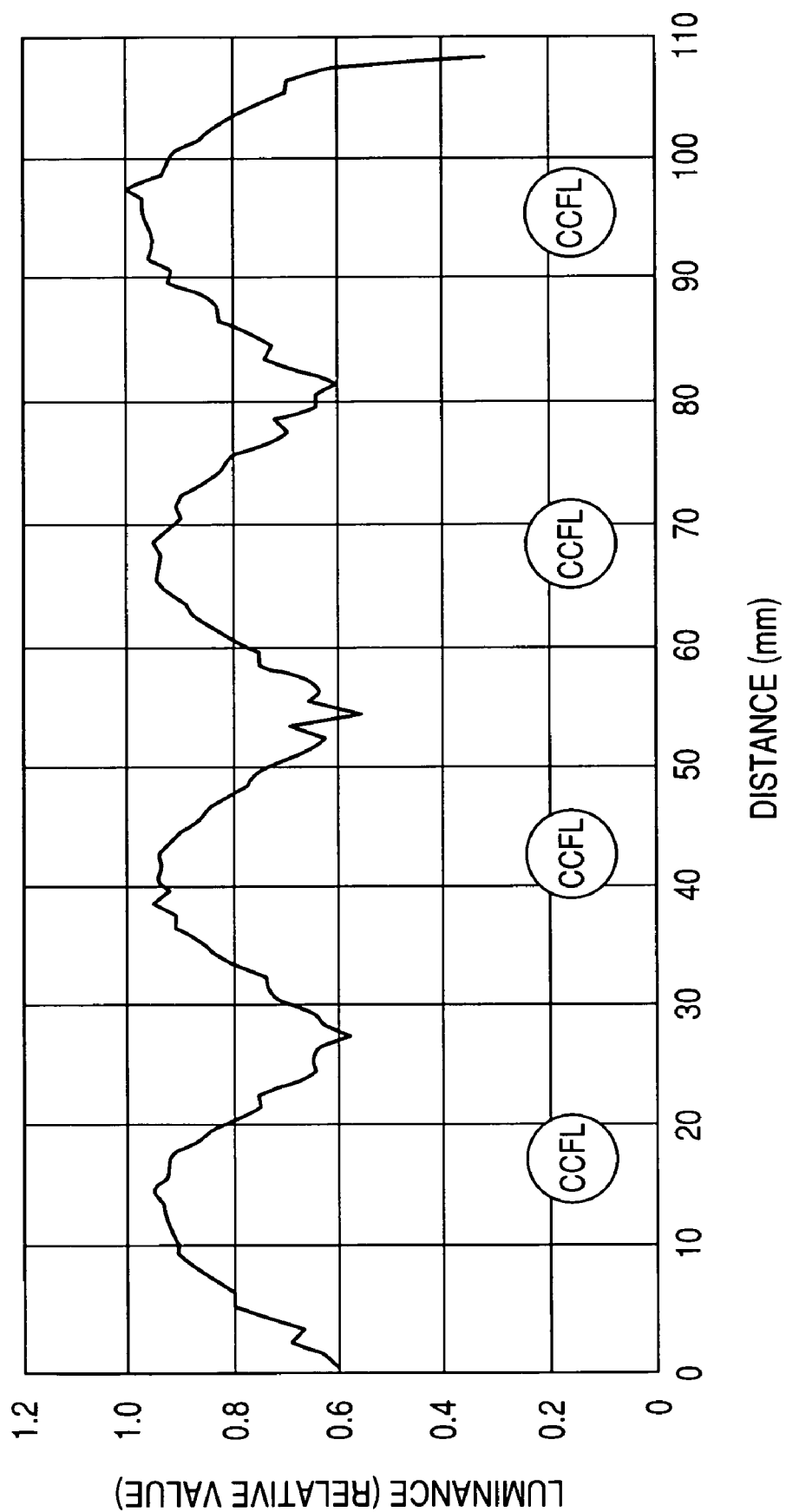

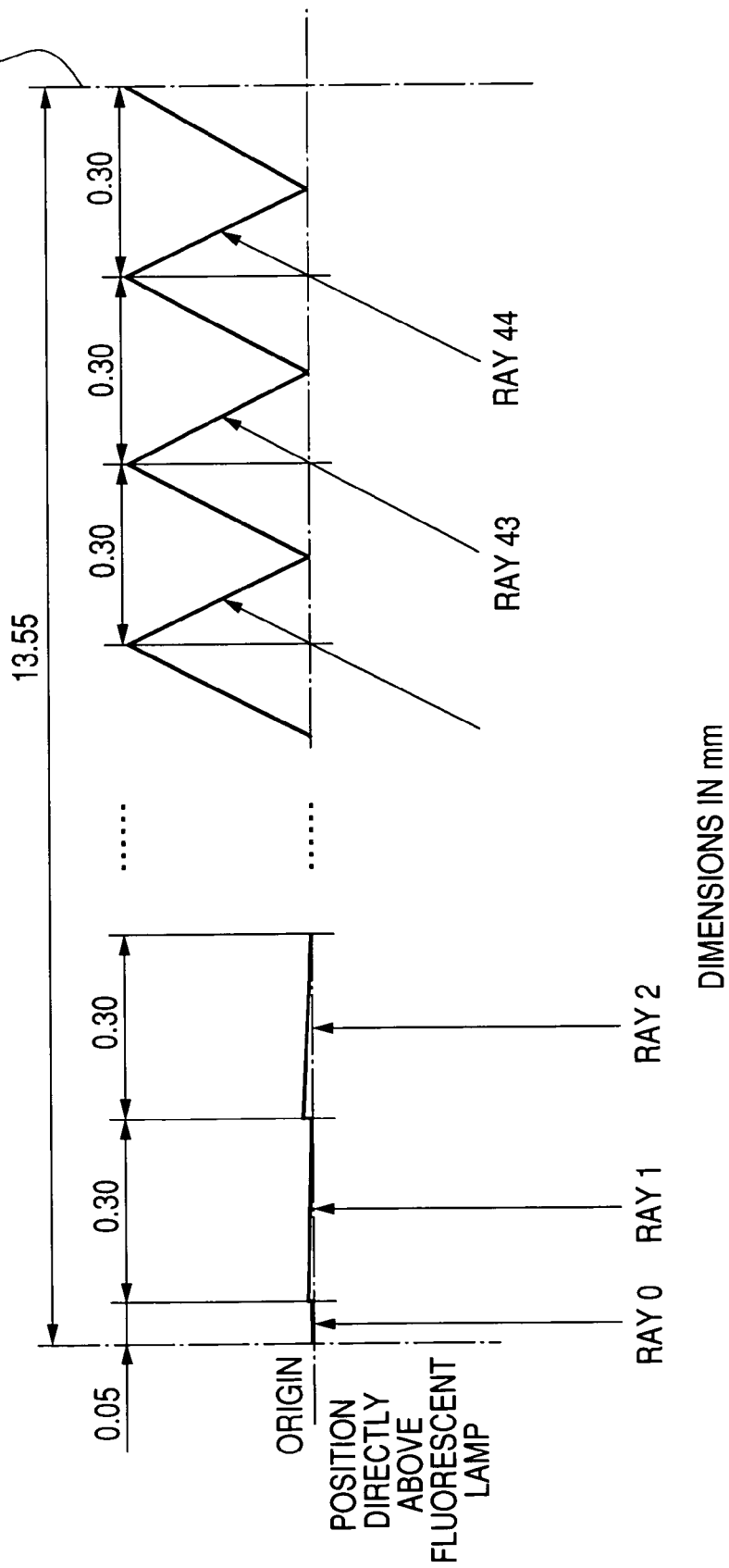

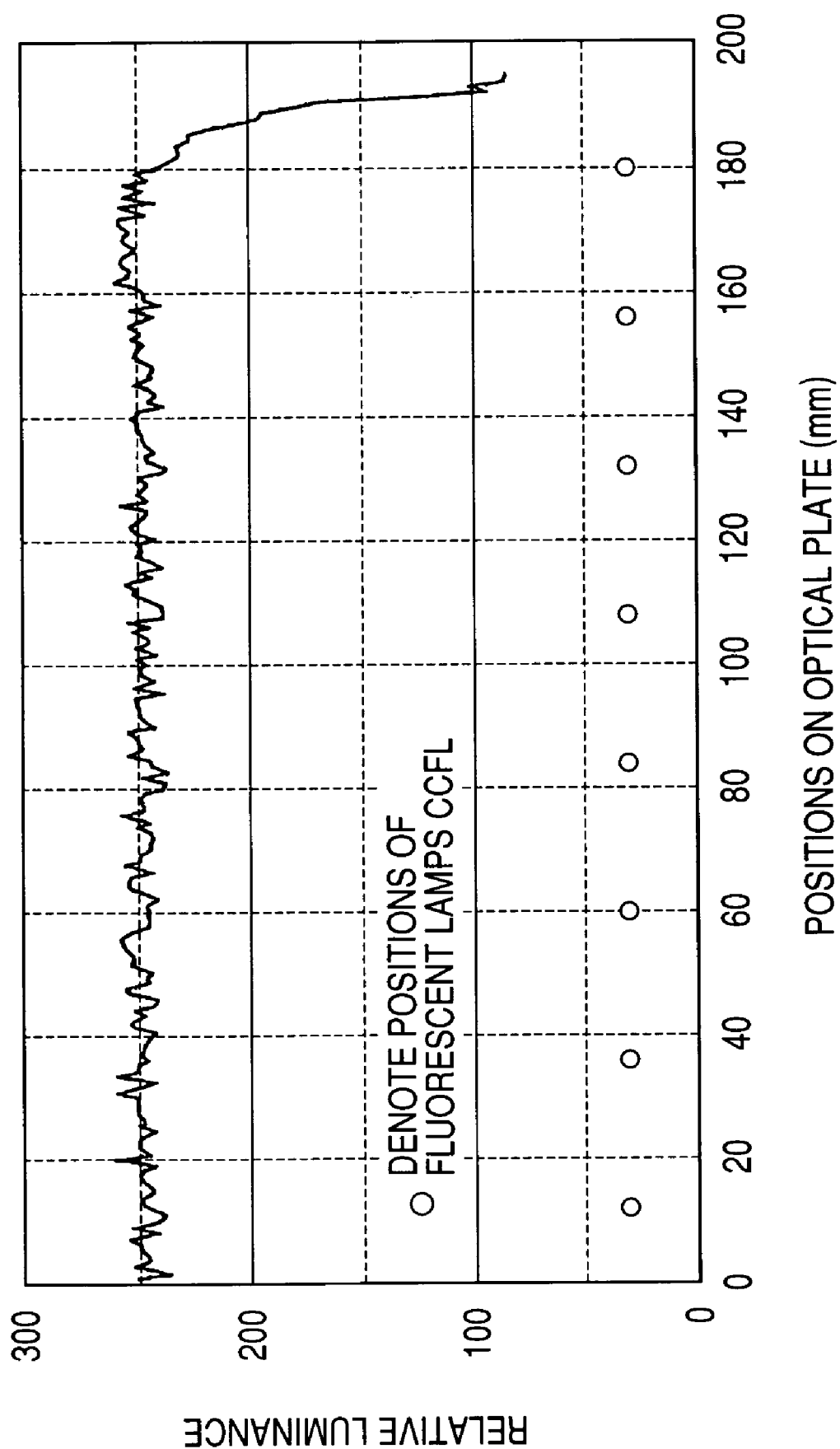

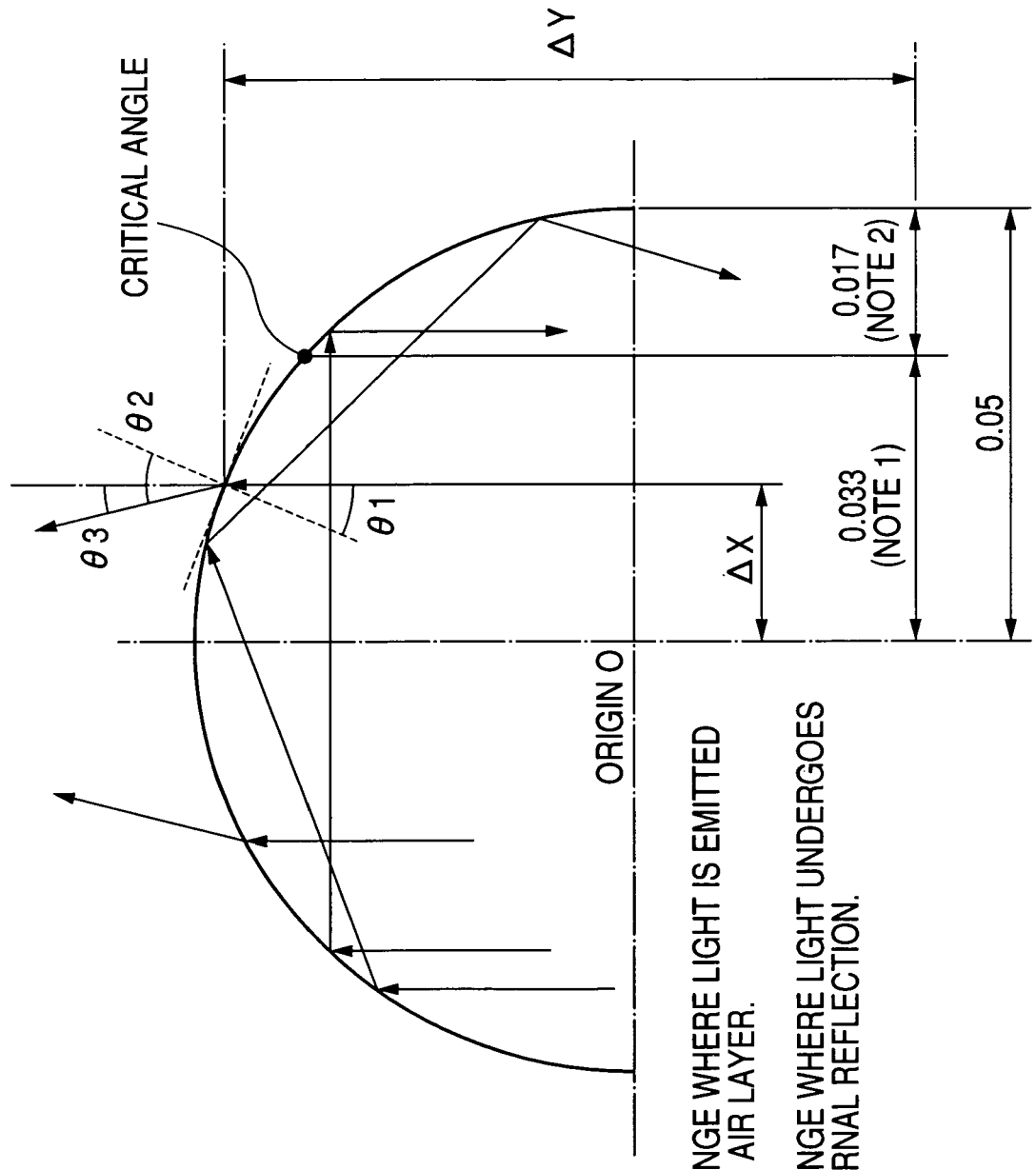

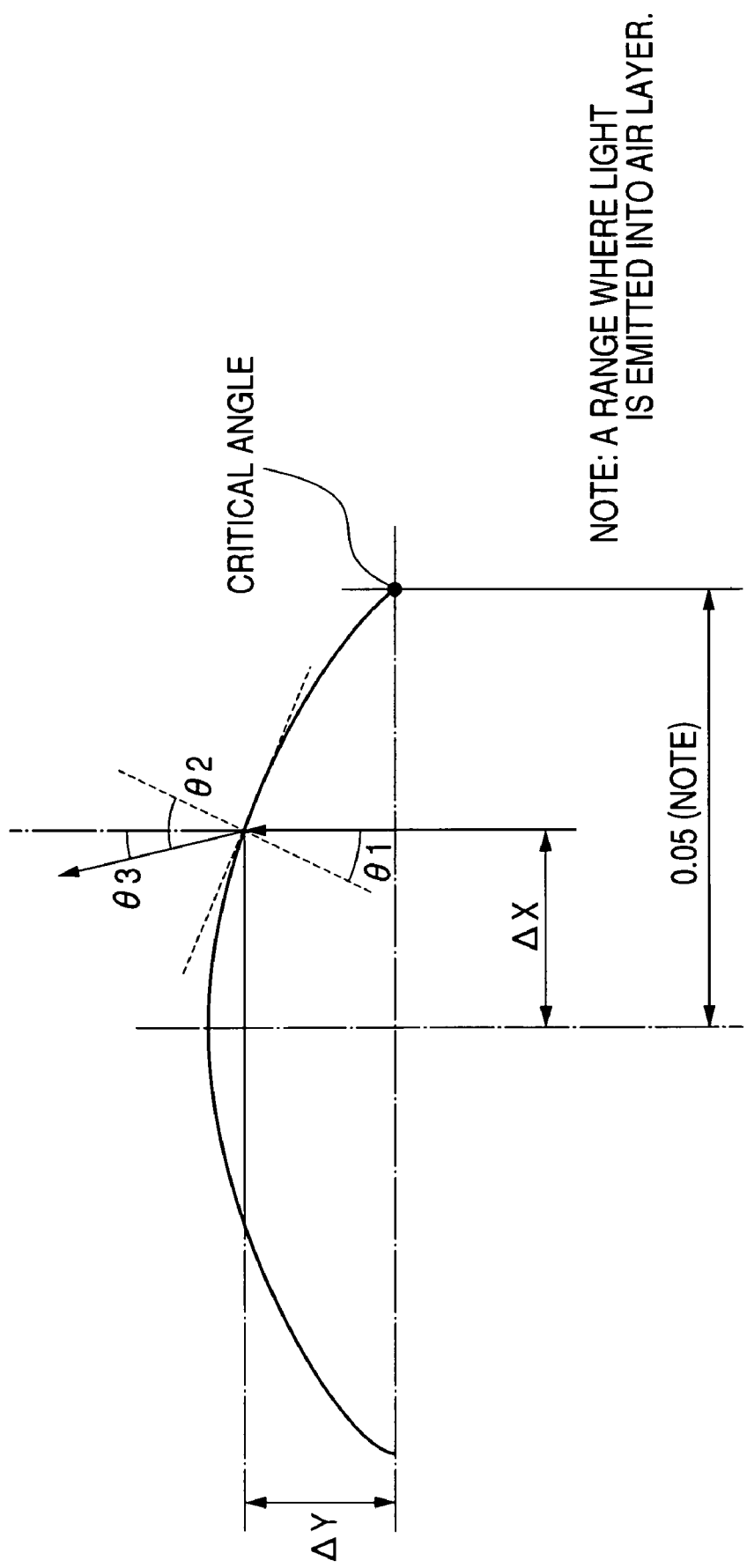

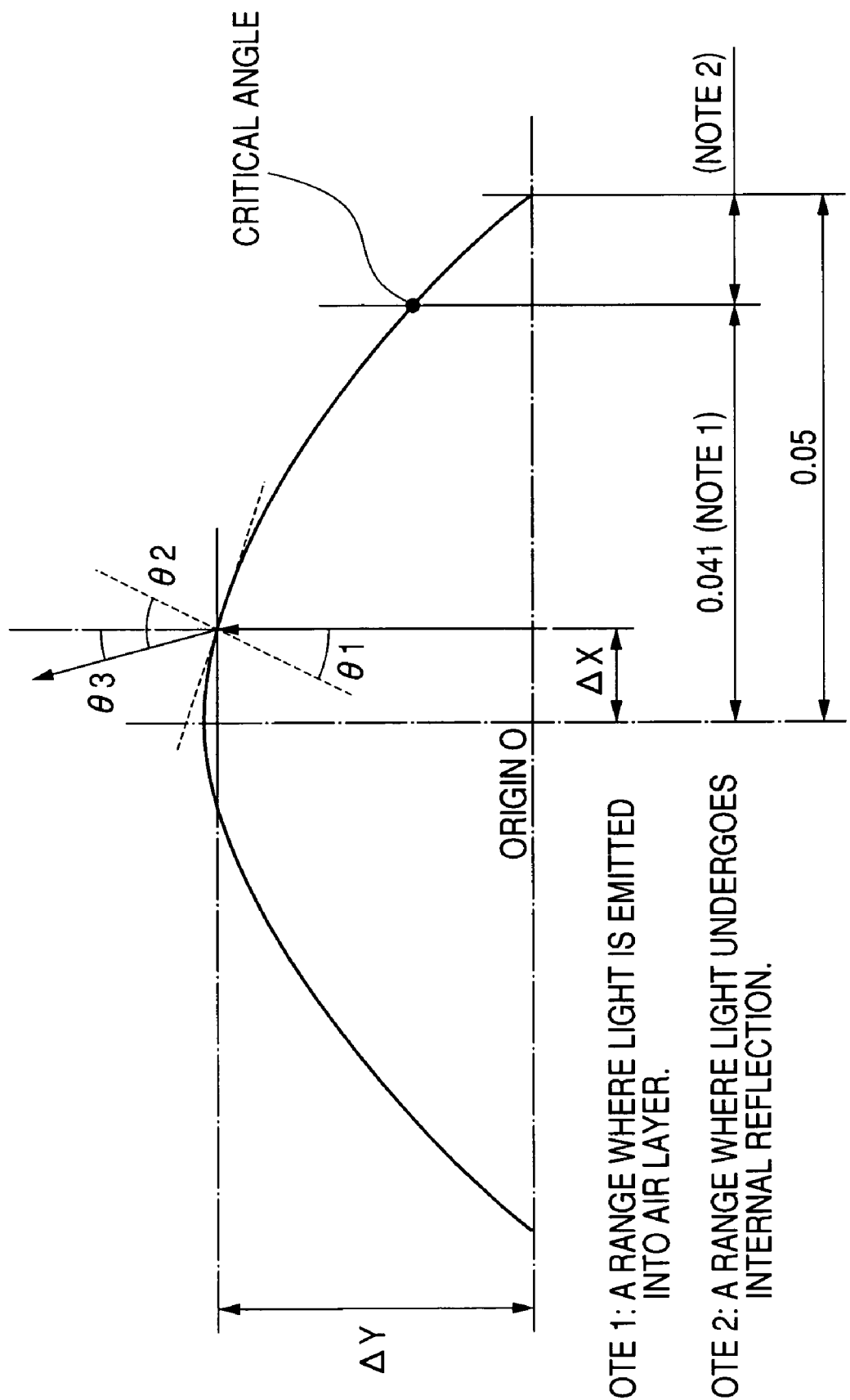

PERPENDICULARLY
INCIDENT LIGHT

LIQUID CRYSTAL DISPLAY DEVICE

CLAIM OF PRIORITY

The present application claims priority from Japanese application serial no. 2004-159611, filed on May 28, 2004, the content of which is hereby incorporated by reference into this application.

BACKGROUND OF THE INVENTION

The present invention relates to a liquid crystal display device, and in particular to a technology useful for application to a backlight disposed behind the liquid crystal display device (hereinafter referred to as a direct-light type backlight). TFT (Thin Film Transistor) liquid crystal display modules are widely used as display devices for notebook personal computers and others. Those liquid crystal display modules comprise a liquid crystal display panel having a drain driver and a gate driver disposed therearound and a backlight for illuminating the liquid crystal display panel. Backlights are divided broadly into side-light type backlights and direct-light type backlights. Generally, the liquid crystal display modules used as display devices for notebook personal computers employ the side-light type backlights. In recent years, liquid crystal display modules have been made large-sized with their screen size increased, and they have been used as display devices for monitors. Such large-sized and large-screen liquid crystal display modules for use in monitors employ direct-light type backlights capable of providing high brightness.

FIG. 11 is an exploded perspective view illustrating a rough configuration of a liquid crystal display module. As shown in FIG. 11, the liquid crystal display module is comprised of an upper frame 1 made of a metal peripheral frame (also called a shield case, an upper case or a metal upper frame), a liquid crystal panel 2 and a backlight BL. The liquid crystal panel is provided with a pair of substrates (made of light-transmissive electrically-insulating material, for example, glass) sandwiching a liquid crystal layer therebetween, a drain circuit board DPCB disposed around the pair of substrates, and two gate circuit boards GPCB. Mounted on each of the circuit boards are tape carrier packages DTCP or GTCP having plural liquid-crystal-driving semiconductor integrated-circuit elements (driving ICs) mounted thereon by using tape automated bonding (TAB). Coupled to the driving ICs are flexible circuit boards DFPC for supplying signals or electric power to the driving ICs and connection flexible circuit boards GFPC are provided for connecting the drain circuit board DPCB with the gate circuit boards GPCB.

The pair of substrates are superposed one upon another with a specified spacing therebetween, and then they are sealed together by using a sealing agent in the form of a picture-frame and sandwiched between the vicinities of peripheries of the two opposing substrates. Next liquid crystal material is filled into a space inside the two sealed substrates via a liquid crystal filling hole made in the sealing agent, and then the liquid crystal filling hole is sealed off. Then the liquid crystal panel 2 is completed by attaching polarizers on the outside surfaces of the two substrates.

The flexible circuit boards DFPC are electrically connected to a circuit board Tcon having integrated circuit elements such as a timing converter and others disposed under the backlight BL. Reference numeral 5 in FIG. 11 denotes a cover for the circuit board Tcon.

FIG. 12 is an exploded perspective view illustrating a rough configuration of the direct-light type backlight BL shown in FIG. 11. As shown in FIG. 12, the direct-light type backlight BL shown in FIG. 11 is comprised of a reflective plate 10, plural cold cathode fluorescent lamps CCFL, a light diffusing plate (relatively thick, 2 mm, for example) 11, a lower light diffusing sheet (relatively thin, several hundreds µm, for example) 12, a prismatic sheet (also called a brightness improving sheet) 13, an upper light diffusing sheet (relatively thin, several hundreds µm, for example) 14 arranged in the order shown in FIG. 12, between a mold 7 made of synthetic resin and a lower frame 3 made of metal. Incidentally, in some cases two prismatic sheets are employed. The liquid crystal display module is completed by sandwiching and fixing the assembled liquid crystal panel 2 between the upper frame 1 and the backlight BL.

As explained above, the direct-light type backlight BL is provided with the plural cold cathode fluorescent lamps CCFL, the plural optical members (the light diffusing plate, the light diffusing sheets, the brightness improving sheet, and others) disposed over the plural cold cathode fluorescent lamps CCFL, and the reflective plate having a reflective surface which reflects toward the liquid crystal display panel the light radiated from the lamps CCFL toward the side of the lamps CCFL opposite from the liquid crystal display panel. However, there is a problem in that the cost of the optical members including the light diffusing plate, the light diffusing sheets, the brightness improving sheets and others account for a large percentage in a range of 40% to 70% of the cost of the direct-light type backlight. To solve this problem, the direct-light type backlights which do not employ the brightness improving sheet are disclosed by Patent Application Laid-Open Publication Nos. 2004-6256, Hei 6-273763, and 2004-31312.

SUMMARY OF THE INVENTION

All the inventions disclosed in the above-cited publications employ light diffusing plates, and they are not configured so as to reduce the cost of a direct-light type backlight by utilizing a transparent optical plate having both a function of making brightness uniform like a light diffusing plate, a light diffusing sheet, or the like and a function of collecting light like a brightness improving sheet or the like.

The present invention has been made so as to solve the above-mentioned problem with the prior art, and it is an object of the present invention to provide a technology capable of reducing the cost of the direct-light type backlight by utilizing a transparent optical plate having both a function of making brightness uniform like a light diffusing plate, a light diffusing sheet, or the like and a function of collecting light like a brightness improving sheet or the like, in a liquid crystal display device employing the direct-light type backlight.

This and other objects and novel features of the present invention will become apparent from the following description and the accompanying drawings.

The following will explain briefly the summary of the representative ones of the inventions disclosed in this specification.

To accomplish the above-described objects, in accordance with an embodiment of the present invention, there is provided a liquid crystal display device comprising a liquid crystal display panel and a backlight disposed on a side of said liquid crystal display panel opposite from a display screen of said liquid crystal display panel, wherein said backlight comprises: a plurality of line light sources arranged in parallel with each other; a transparent optical plate disposed on a side of said plurality of line light sources facing toward said liquid crystal display panel; a plurality of minute optical controlling elements formed on a surface of said optical plate facing toward said liquid crystal display panel, and wherein said plurality of minute optical controlling elements extend in parallel with said plurality of line light sources, and said plurality of minute optical controlling elements are symmetrical in a cross section perpendicular to longitudinal axes of said plurality of line sources, between two adjacent planes each of which passes midway between two adjacent ones of said plurality of line light sources and each of which is perpendicular to said optical plate.

To accomplish the above-described objects, in accordance with another embodiment of the present invention, there is provided a liquid crystal display device comprising a liquid crystal display panel and a backlight disposed on a side of said liquid crystal display panel opposite from a display screen of said liquid crystal display panel, wherein said backlight comprises: a plurality of line light sources arranged in parallel with each other; a transparent optical plate disposed on a side of said plurality of line light sources facing toward said liquid crystal display panel; a plurality of minute optical controlling elements attached to a surface of said optical plate facing toward said liquid crystal display panel, and wherein said plurality of minute optical controlling elements extend in parallel with said plurality of line light sources, and said plurality of minute optical controlling elements are symmetrical in a cross section perpendicular to longitudinal axes of said plurality of line sources, between two adjacent planes each of which passes midway between two adjacent ones of said plurality of line light sources and each of which is perpendicular to said optical plate.

The following will explain briefly the advantages provided by the representative ones of the inventions disclosed in this specification.

The present invention is capable of reducing the cost of the direct-light type backlight by utilizing a transparent optical plate having both a function of making brightness uniform like a light diffusing plate, a light diffusing sheet, or the like and a function of collecting light like a brightness improving sheet or the like, in a liquid crystal display device employing the direct-light type backlight.

BRIEF DESCRIPTION OF THE DRAWINGS

In the accompanying drawings, in which like reference numerals designate similar components throughout the figures, and in which:

FIG. 4A is an illustration of an optical plate having minute optical controlling elements in accordance with an example of the present invention;

FIG. 5 is a graph showing a brightness distribution produced by light emerging from an optical plate having the minute optical controlling elements formed on its upper surface shown in FIG. 4;

FIG. 6 is a cross-sectional view of another embodiment of minute optical controlling elements formed on an optical plate in accordance with the present invention;

FIG. 8 is a graph showing a brightness distribution produced by light emerging from an optical plate having the minute optical controlling elements formed on its upper surface shown in FIG. 7;

FIGS. 9A to 9D are cross-sectional views of major portions of four examples of a minute optical controlling element in accordance with the present invention for eliminating a difference in brightness level, respectively;

DETAILED DESCRIPTION OF THE PREFERRED EMBODIMENTS

Figure 1:
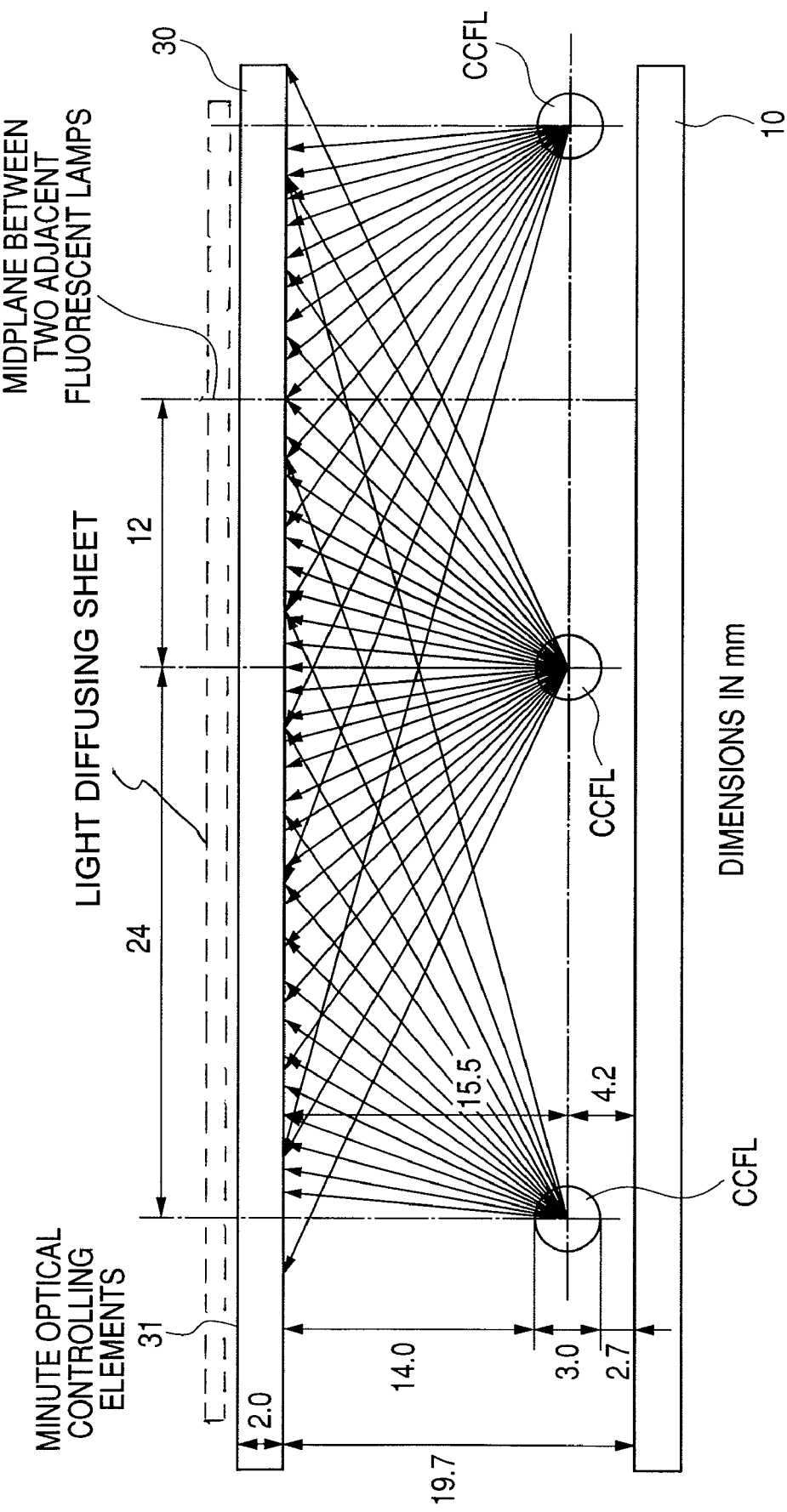
FIG. 1 is a cross-sectional view of major components of a direct-light type backlight in accordance with an embodiment of the present invention.

In the following, the embodiments in accordance with the present invention will be explained in detail by reference to the drawings. The same reference numerals or symbols designate functionally similar parts or portions throughout the figures, and repetition of their explanation is omitted.

The direct-light type backlight in accordance with the present invention is conventional in construction except for the features now to be discussed.

In the following, the embodiments of the direct-light type backlight in accordance with the present invention will be explained centering on portions which are different from those in the conventional direct-light type backlights.

FIG. 1 is a cross-sectional view illustrating an essential portion of an embodiment of the direct-light type backlight in accordance with the present invention. In FIG. 1, reference numeral 10 denotes a reflective plate, 30 is a transparent optical plate, and 31 are minute optical controlling elements formed on an upper surface of the optical plate 30.

While conventional light diffusing plates used in direct-light type backlights are optical plates containing diffusing agents, the optical plate 30 in this embodiment is made of transparent acrylic, polycarbonate (PC), polycycloolefin or the like not containing diffusing agents, and its total luminous transmittance is in a range of 90% to 100%, for example. Further, the optical plate 30 in this embodiment is configured so as to facilitate the control of the direction and distribution of light rays, and also to make the most of light emitted from cold cathode fluorescent lamps CCFL.

Here the total luminous transmittance $\tau t$ (%) is computed by using the following formula in accordance with the ISO 13468-1:1996 test method (which corresponds to JIS K 7361-1:1997), $$\tau t(\%) = \tau 2/\tau 1 \times 100,$$

where $\tau 1$ is a luminous flux measured in the absence of a test piece, and $\tau 2$ is a luminous flux measured in the presence of the test piece in test equipment including a light source equivalent to the CIE standard light $D_{65}$, a collimator tube for collimating a light beam from the light source into a parallel beam of light, an integrating sphere and a photodetector.

The minute optical controlling elements 31 may be integrally molded with the transparent optical plate 30, or may be formed on the transparent optical plate by machining as by using a cutter. Further, initially the minute optical controlling elements 31 may be formed on a film or sheet separate from the transparent optical plate 30, then the film or sheet formed with the minute optical controlling elements may be attached to the transparent optical plate 30.

About 40% of the quantity of light emitted from cold cathode fluorescent lamps CCFL is irradiated directly onto the transparent optical plate 30. The minute optical controlling elements 31 are formed on the upper surface of the transparent optical plate 30 to control so as to make as much quantity of the irradiated light as possible emerge from the upper surface of the transparent optical plate 30 in directions perpendicular to the upper surface of the optical plate 30.

The following will explain the behavior of light having emerged from the cold cathode fluorescent lamps CCFL.

Figure 2:
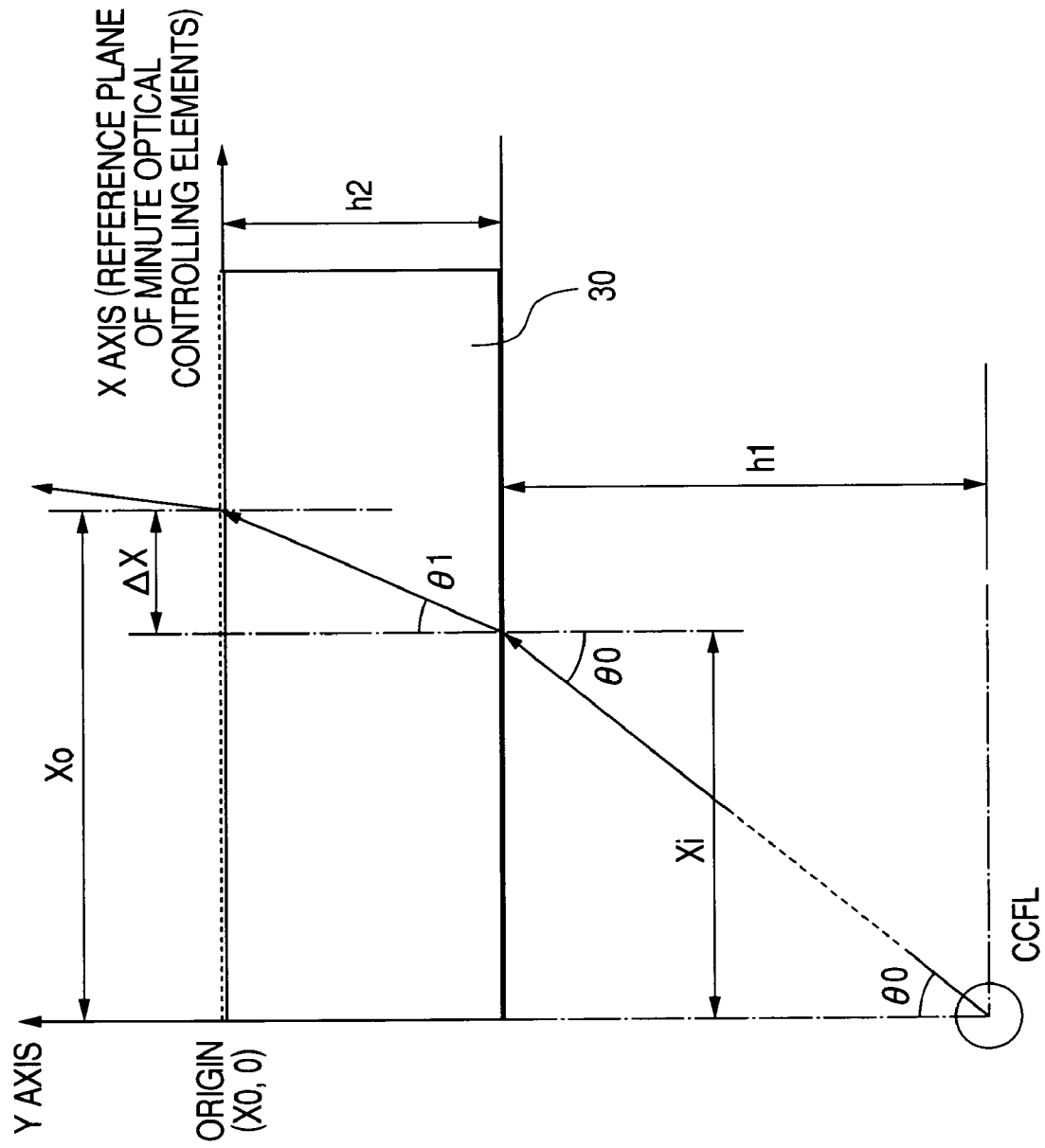
FIG. 2 is an illustration for explaining a behavior of a light ray emerging from a cold cathode fluorescent lamp CCFL.

As shown in FIG. 2., assume that a light ray emerges from the cold cathode fluorescent lamp CCFL at an angle $\theta 0$ with respect to the normal to the transparent optical plate 30. Then the light ray enters the lower surface of the transparent optical plate 30 at an incident angle $\theta 0$. Then the light ray is directed to the upper surface of the transparent optical plate 30 at a refraction angle $\theta 1$ represented by Equation (1) below in accordance with Snell's law $$n0 \cdot \sin \theta 0 = n1 \cdot \sin \theta 1 \tag{1}$$

where $n0$=the refractive index of the medium through which the light ray travels before entering the transparent optical plate 30 (the medium here is air, and $n0 \approx 1.0$), and $n1$=the refractive index of the transparent optical plate 30 (in the case of the acrylic plate, $n1 \approx 1.4933$).

In a case where the minute optical controlling elements 31 are not formed on the upper surface of the transparent optical plate 30, the light ray emerges from the transparent optical plate 30 at an angle $\theta 0$ with respect to the normal to the transparent optical plate 30 in accordance with Snell's law. However, if the refraction angle $\theta 1$ is greater than a critical angle, the light ray is reflected at an interface between the transparent optical plate 30 and the air layer, and is returned to the lower surface of the transparent optical plate 30. In this case where the minute optical controlling elements 31 are not present on the upper surface of the transparent optical plate 30, and therefore the upper surface of the transparent optical plate 30 is flat, the emerging angle at which light ray emerges from the upper surface of the transparent optical plate 30 into the air layer depends upon the emerging angle at which the light ray emerges from the cold cathode fluorescent lamp CCFL, and consequently, few of the light rays from the lamp CCFL emerges from the upper surface of the optical plate 30 in a direction perpendicular to the optical plate 30.

To solve this problem, this embodiment disposes on the upper surface of the transparent optical plate 30 the minute triangular optical controlling elements 31 having a triangular cross section provided with sloped surfaces which project light entering the transparent optical plate 30 from the lamp CCFL in a direction perpendicular to the optical plate 30. These minute optical controlling elements 31 extend in the same direction as the extension of the cold cathode fluorescent lamps CCFL.

Figure 3:
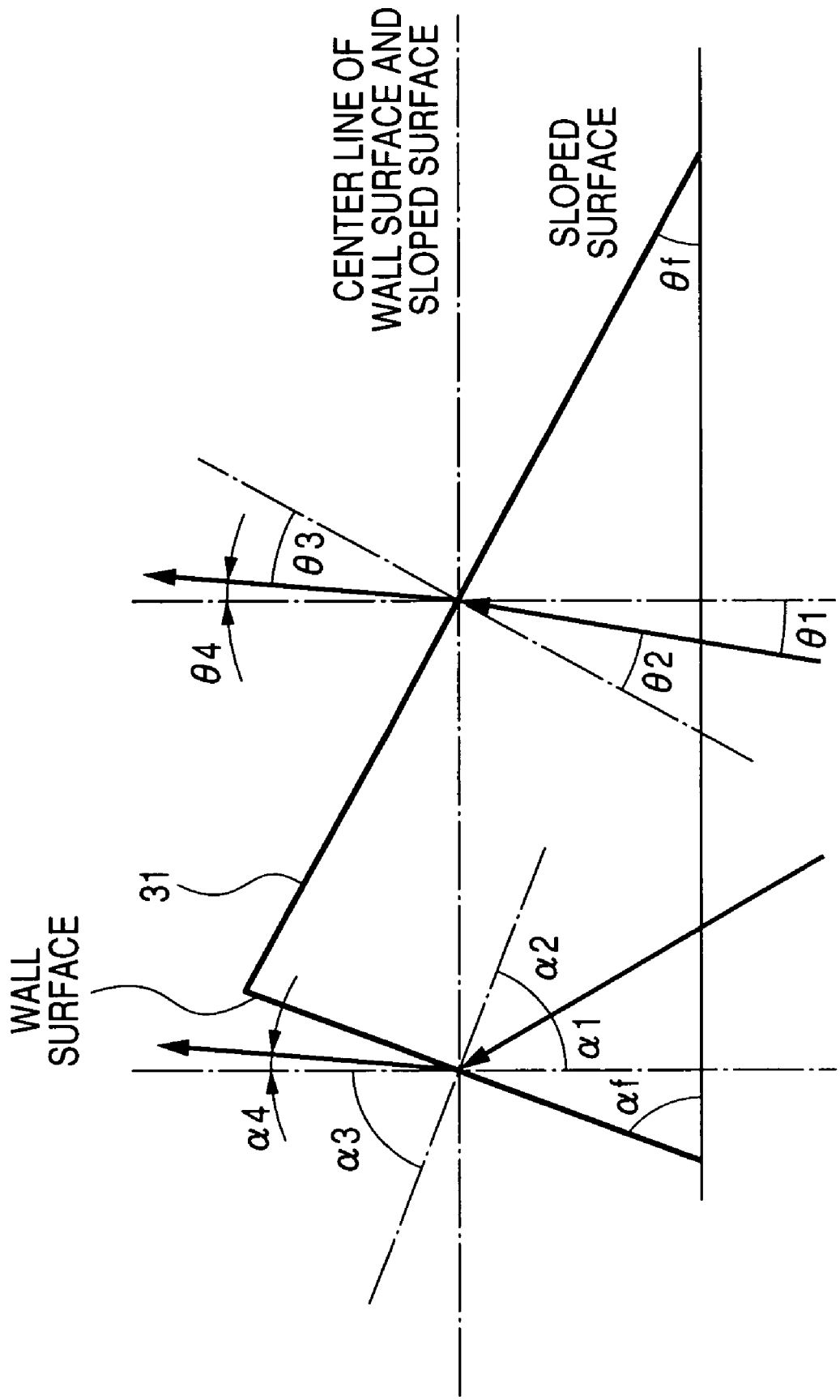
FIG. 3 is a cross-sectional view of a minute optical controlling element in accordance with an embodiment of the present invention taken in a plane perpendicular to a direction of extension of a cold cathode fluorescent lamp CCFL.

FIG. 3 is a cross-sectional view of the minute optical controlling element 31 taken along a plane perpendicular to the direction of the extension of the cold cathode fluorescent lamps CCFL. Consider a center line passing through the longitudinal axis of the cold cathode fluorescent lamps CCFL and perpendicular to the lower (or upper) surface of the transparent optical plate 30. In FIG. 3, a controlling-element wall surface is one of two sloped surfaces closer to the center line, and a controlling-element wall surface angle $\alpha f$ is an angle which the controlling-element wall surface makes with the upper surface of the optical plate 30.

Further, in FIG. 3, a controlling-element sloped surface is the other of the two sloped surfaces farther from the center line, and a controlling-element sloped surface angle $\theta f$ is an angle which the controlling-element sloped surface makes with the upper surface of the optical plate 30.

The controlling-element sloped surface angle $\theta f$ is intended to project light emitted from the closest one of the cold cathode fluorescent lamps CCFL in the direction perpendicular to the optical plate 30, and the controlling-element wall surface angle $\alpha f$ is intended to project light emitted from the closest one of the cold cathode fluorescent lamps CCFL in the direction perpendicular to the optical plate 30.

In FIGS. 2 and 3, the following relationships are satisfied:

$$Xi = h1 \cdot \tan \theta 0 \tag{2}$$

$$\Delta X = h2 \cdot \tan \theta 1 \tag{3}$$

$$Xo = Xi + \Delta X \tag{4},$$

where $h1$=a distance between the longitudinal axis of the cold cathode fluorescent lamps CCFL and the lower surface of the transparent optical plate 30, and $h2$=a thickness of the transparent optical plate 30.

The following Equation (5) represented by $\theta 0$ is obtained by combining Equation (4) with Equations (1), (2) and (3):

$$Xo = h1 \cdot \tan \theta 0 + h2 \cdot \tan \{\arc \sin (\sin \theta 0 \cdot n0/n1)\} \tag{5}$$

Further, among the emerging angle $\theta 0$ at which light emerges from the cold cathode fluorescent lamps CCFL, the controlling-element sloped surface angle of $\theta f$ of the minute optical controlling element 31, and an emerging angle $\theta 4$ at which the light emerges from the upper surface of the transparent optical plate 30 into the air layer, the following relationships are satisfied:

$$\theta 2 = |\theta 1 + \theta f| \tag{6}$$

$$n1 \cdot \sin \theta 2 = n0 \cdot \sin \theta 3 \tag{7}$$

$$\begin{aligned} \theta 4 &= \theta f + \theta 3, \text{ when } -\theta f \geq \theta 1, \\ &= \theta f - \theta 3, \text{ when } -\theta f < \theta 1 \end{aligned} \tag{8}$$

The following Equation (9) represented by $\theta 0$ and $\theta f$ is obtained by combining Equation (8) with Equations (1), (6) and (7):

when $-\theta f \geq \arc \sin \{(n0/n1) \cdot \sin \theta 0\}$ $\theta 4 = \theta f + \arc \sin [(n1/n0) \cdot \sin |\arc \sin \{(n0/n1) \cdot \sin \theta 0\} + \theta f|]$ when $-\theta f < \arc \sin \{(n0/n1) \cdot \sin \theta 0\}$ $\theta 4 = \theta f - \arc \sin [(n1/n0) \cdot \sin |\arc \sin \{(n0/n1) \cdot \sin \theta 0\} + \theta f|] \tag{9}$ Consider a light ray which emerges from the cold cathode fluorescent lamp CCFL and reaches a point (Xo, 0) on a reference plane on the upper surface of the transparent optical plate 30, and determine an emerging angle θ0 at which the light ray emerges from the cold cathode fluorescent lamp CCFL using Equation (5). Substitution of the emerging angle θ0 into Equation (9) yields a relationship between θ4 and θf. Here, the controlling-element sloped surface angle θf of the minute optical controlling element 31 is selected so that the emergent angle θ4 at which the light ray emerges into the air layer from the upper surface of the transparent optical plate 30 is equal to zero.

As the size of the minute optical controlling elements 31 is increased, a distribution of the emergent angles of the light rays emerging from one piece of the minute optical controlling elements 31 is widened right and left with respect to the normal to the transparent optical plate 30, and as the size of the minute optical controlling elements 31 is reduced, the distribution of the emergent angles is narrowed.

It is desirable to make as many light rays as possible emerge perpendicularly to the transparent optical plate 30 by narrowing the distribution of the emergent angles. However, if the size of the minute optical controlling elements 31 is reduced excessively, their workability and mass productivity are deteriorated, and therefore, the size of the minute optical controlling elements 31 needs to be selected by considering the balance between the distribution of the emergent angles and their workability and mass productivity.

Figure 4:
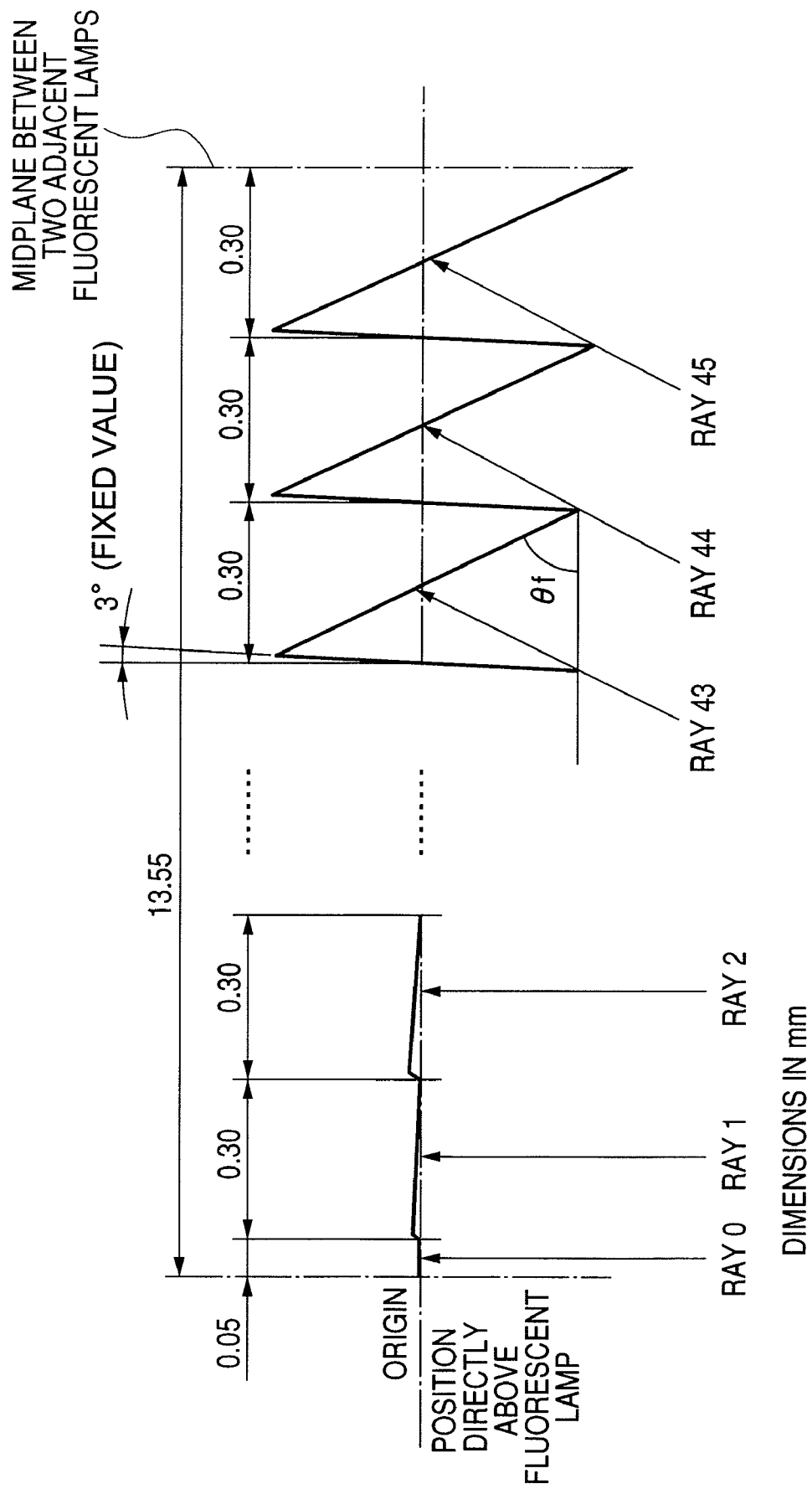
FIG. 4 is a cross-sectional view of an embodiment of minute optical controlling elements formed on an optical plate in accordance with the present invention.

FIG. 4 illustrates an example of the minute optical controlling elements 31 formed on the transparent optical plate 30 in accordance with this embodiment. The following describes dimensions and component configurations of this example.
(1) a distance h1 between the longitudinal axis of the cold cathode fluorescent lamp CCFL and the lower surface of the optical plate (transparent acrylic plate) 30: 13.5 mm,
(2) a thickness h2 of the optical plate (transparent acrylic plate) 30: 2.0 mm,
(3) a centerline-to-centerline spacing d1 between adjacent ones of the cold cathode fluorescent lamps CCFL: 27.1 mm,
(4) half the centerline-to-centerline spacing d1 between adjacent ones of the cold cathode fluorescent lamps CCFL: 27.1 mm, d2: 13.55 mm,
(5) a refractive index of air, n0: 1.0,
(6) a refractive index of the transparent optical plate 30, n1: 1.49,
(7) the number of the cold cathode fluorescent lamps CCFL: 8,
(8) a size of the minute optical controlling elements 31 except for ones at the center: 0.3 mm (a fixed value),
(9) a controlling-element wall surface angle αf of the minute optical controlling elements 31: 87° (a fixed value).

FIG. 4A illustrates this example of the optical plate 30 having the minute optical controlling-elements 31 on its upper surface in which the controlling-element wall surface angles αf are fixed and the controlling-element sloped surface angels θf are varied.

FIG. 5 shows a brightness distribution of light irradiated from the optical plate 30 having thereon the minute optical controlling elements 31 shown in FIG. 4. FIG. 5 shows the brightness distribution on the upper half of a vertical center line of a display area.

Figure 12:
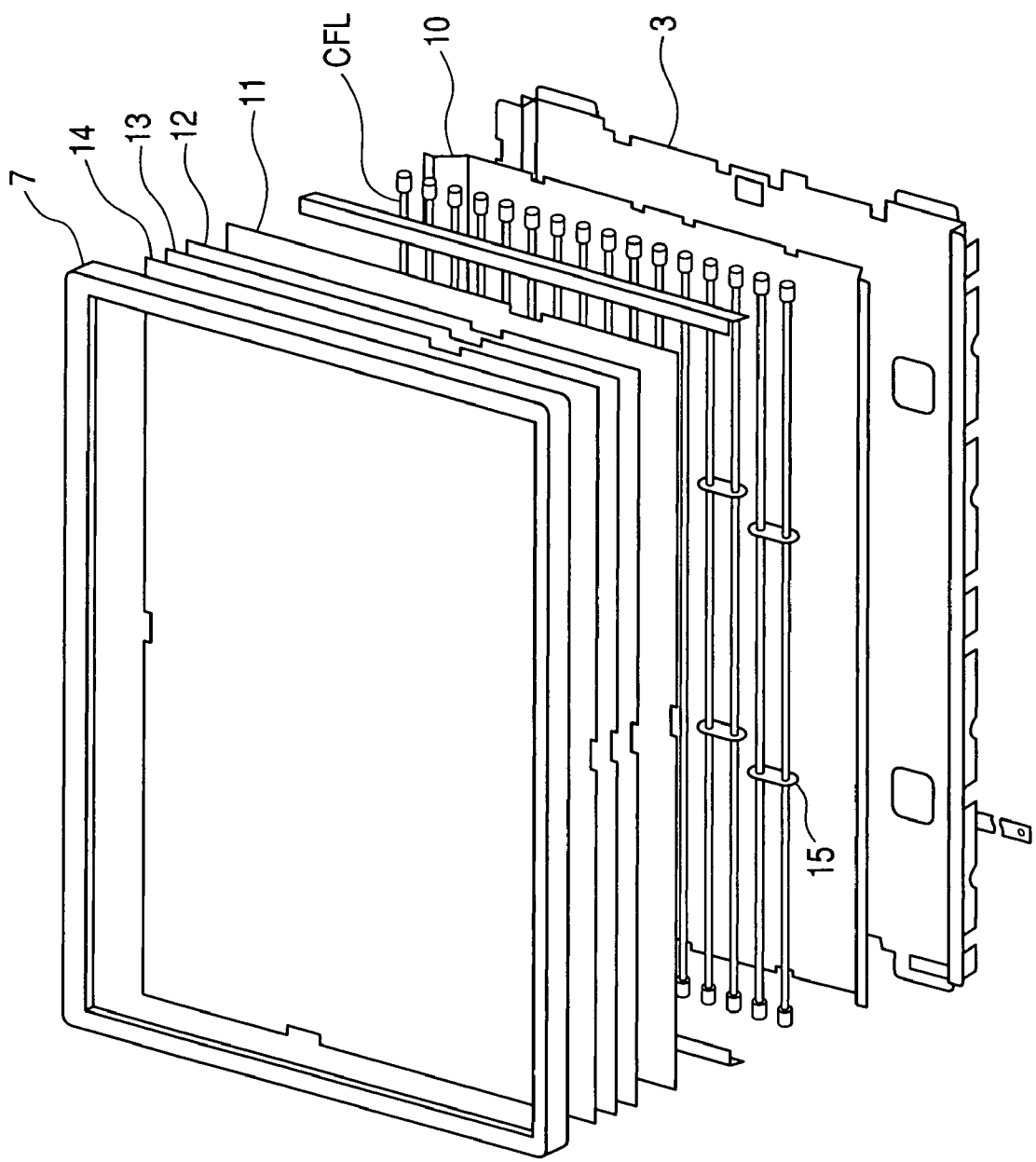
FIG. 12 is an exploded perspective view illustrating a rough configuration of a direct-light type backlight BL shown in FIG. 11.

The average brightness produced by the optical plate 30 having thereon the minute optical controlling elements 31 shown in FIG. 4 is higher than that of the conventional direct-light type backlight, but the uniformity in brightness (a difference in brightness level) produced by the optical plate 30 is somewhat lower than that of the conventional direct-light type backlight. Here, the difference in brightness level is represented by (the maximum brightness—the minimum brightness)/the average brightness. The difference in brightness level can be reduced by disposing the conventional light-diffusing sheets (which are illustrated at reference numerals 12, 14 in FIG. 12), as indicated by broken lines in FIG. 1, on a liquid-crystal-display-panel side of the optical plate 30.

Further, in the case of the optical plate 30 having thereon the minute optical controlling elements 31 shown in FIG. 4, a viewing angle at which brightness falls to half the maximum brightness, a so-called half-brightness width, is about ±10° in a vertical direction, and about ±45° in a horizontal direction. The half-brightness width in the vertical direction can be improved to about ±45° by disposing the conventional light-diffusing sheets (which are illustrated at reference numerals 12, 14 in FIG. 12), as indicated by broken lines in FIG. 1, on a liquid-crystal-display-panel side of the transparent optical plate 30.

As described above, the difference in brightness level produced by the optical plate 30 having thereon the minute optical controlling elements 31 shown in FIG. 4 has exhibited unsatisfactory performance.

The reasons for this are classified into three large groups.

Firstly, in the above-explained embodiment, the controlling-element sloped surface angles of θf the minute optical controlling elements 31 is selected by considering light emerging only from the cold cathode fluorescent lamp CCFL closest to the minute optical controlling elements, and the controlling-element wall surface angle αf was fixed at 3°. Therefore, it is pointed out that the light from the closest cold cathode fluorescent lamp CCFL is not utilized effectively, and that the behavior of light emerging from the adjacent cold cathode fluorescent lamps CCFL is not considered.

Secondly, this embodiment is principally aimed at projecting the light emerging from the cold cathode fluorescent lamps CCFL in the direction perpendicular to the optical plate 30 by using the minute optical controlling elements 31 formed thereon, therefore a distribution of the light emerging from the cold cathode fluorescent lamps CCFL is not considered, and consequently, it is pointed out that the luminous flux density immediately above the cold cathode fluorescent lamps CCFL is high and the luminous flux density midway between adjacent ones of the cold cathode fluorescent lamps CCFL is low.

Thirdly, it is pointed out that the behavior of the light is not considered which has been projected onto the reflective plate 10 and peripheral side walls after emerging from the cold cathode fluorescent lamps CCFL.

To eliminate the first-named problem, by considering the behavior of the light emerging from adjacent ones of the cold cathode fluorescent lamps CCFL, the controlling-element wall surface angles αf of the minute optical controlling elements 31 were modified which influence the behavior of the light from the adjacent cold cathode fluorescent lamps CCFL.

Changing of the controlling-element wall surface angles αf changes areas of the controlling-element wall surface and the controlling-element sloped surfaces, and consequently, these two kinds of changes modify the differences in brightness level.

FIG. 6 illustrates an example of the optical plate 30 having the minute optical controlling elements 31 on its upper surface in which the controlling-element wall surface angles αf are modified. The following describes dimensions and component configurations of this example.
(1) a distance h1 between the longitudinal axis of the cold cathode fluorescent lamp CCFL and the lower surface of the optical plate (transparent acrylic plate) 30: 13.5 mm, (2) a thickness h2 of the optical plate (transparent acrylic plate) 30: 2.0 mm,
(3) a centerline-to-centerline spacing d1 between adjacent ones of the cold cathode fluorescent lamps CCFL: 27.1 mm,
(4) half the centerline-to-centerline spacing d1 between adjacent ones of the cold cathode fluorescent lamps CCFL, d2: 13.55 mm,
(5) a refractive index of air, n0: 1.0,
(6) a refractive index of the transparent optical plate 30, n1 1.49,
(7) the number of the cold cathode fluorescent lamps CCFL: 8,
(8) a size of the minute optical controlling elements 31 except for ones at the center: 0.3 mm (a fixed value),
(9) a controlling-element wall surface angle $\alpha f$ of the minute optical controlling elements 31: equal to an emergent angle at which the light emerges from one of the cold cathode fluorescent lamps CCFL closest to the minute optical controlling element 31.

In the case of the example shown in FIG. 6, the average brightness is higher than that of the conventional direct-light type back light, and further, by disposing the conventional light-diffusing sheets (which are illustrated at reference numerals 12, 14 in FIG. 12) on a liquid-crystal-display-panel side of the optical plate 30, the difference in brightness level could be reduced to 6%, and the half-brightness width in the vertical direction can be improved to about ±45°.

Figure 7:
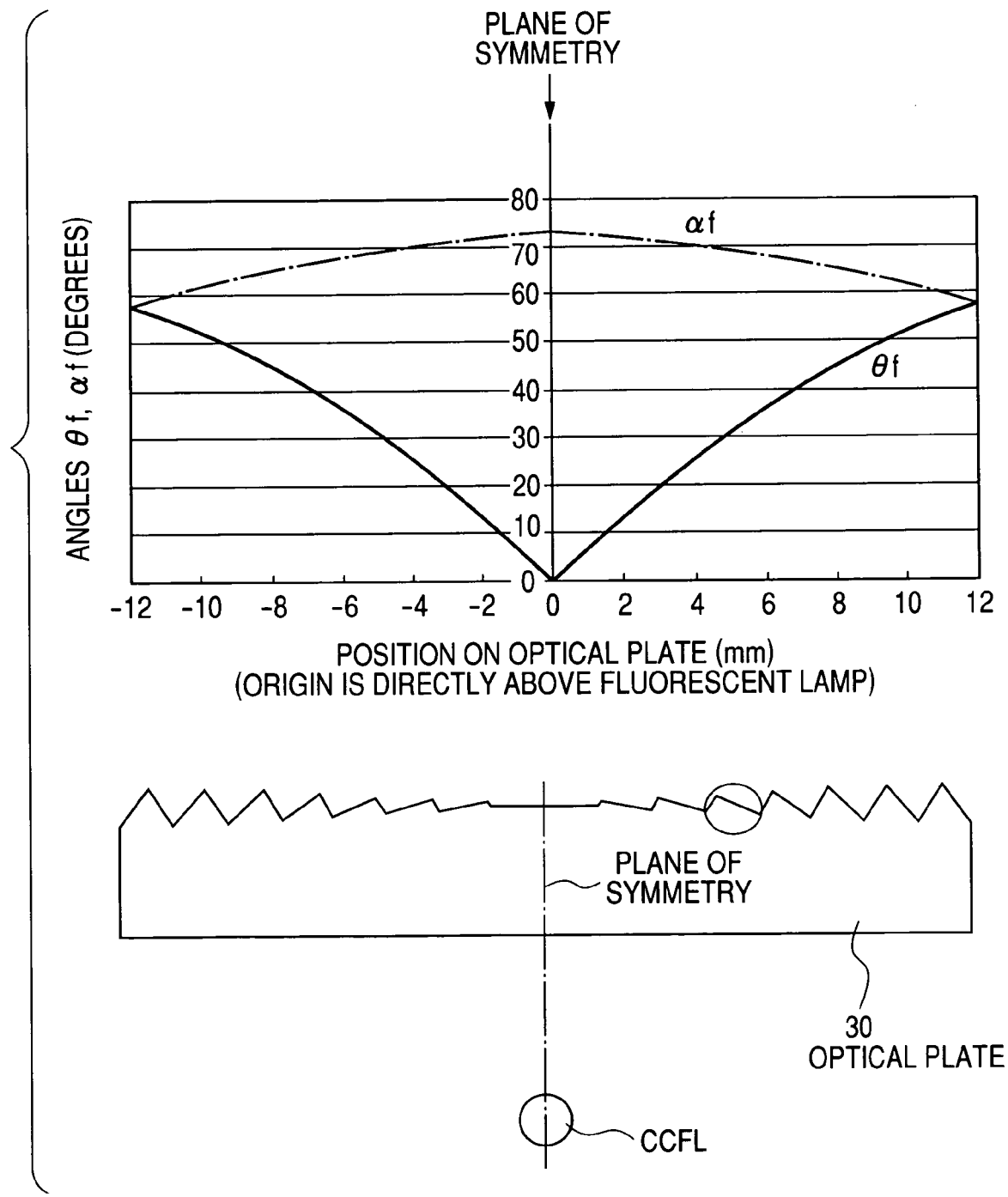
FIG. 7 is a cross-sectional view of still another embodiment of minute optical controlling elements formed on an optical plate in accordance with the present invention.

FIG. 7 illustrates another example of the optical plate 30 having the minute optical controlling elements 31 on its upper surface in which the controlling-element wall surface angles $\alpha f$ are varied. The following describes dimensions and component configurations of this example.

(1) a distance h1 between the longitudinal axis of the cold cathode fluorescent lamp CCFL and the lower surface of the optical plate (transparent acrylic plate) 30: 15.5 mm,
(2) a thickness h2 of the optical plate (transparent acrylic plate) 30: 2.0 mm,
(3) a centerline-to-centerline spacing d1 between adjacent ones of the cold cathode fluorescent lamps CCFL: 24.0 mm,
(4) half the centerline-to-centerline spacing d1 between adjacent ones of the cold cathode fluorescent lamps CCFL, d2: 12.0 mm,
(5) a refractive index of air, n0: 1.0,
(6) a refractive index of the transparent optical plate 30, n1: 1.49,
(7) the number of the cold cathode fluorescent lamps CCFL: 16,
(8) a size of the minute optical controlling elements 31 except for ones at the center: 0.3 mm (a fixed value),
(9) a relationship between controlling-element wall surface angles $\alpha f$ and controlling-element sloped surface angles $\theta f$ of the minute optical controlling elements 31: expressed by a graph shown in FIG. 7.

FIG. 8 shows a brightness distribution by light projected by the optical plate 30 having the minute optical controlling elements 31 formed on its upper surface as shown in FIG. 7. FIG. 8 shows a brightness distribution along the upper part of the vertical centerline of the display area.

In the case of the configuration shown in FIG. 7, the average luminance was higher than that of the conventional direct-light type backlight. Further, by disposing the conventional light-diffusing sheets (which are illustrated at reference numerals 12, 14 in FIG. 12) on a liquid-crystal-display-panel side of the optical plate 30, the difference in brightness level could be reduced to 6%, and the half-brightness width in the vertical direction could be improved to about ±45°.

To reduce the difference in brightness level, in addition to the above-mentioned configuration, it is necessary to modify the shapes of the minute optical controlling elements 31 on portions of the upper surface of the transparent optical plate 30 producing luminance higher than the average luminance so that the surplus of light in the high-brightness portions is redirected to the low-brightness portions.

Figure 9C:
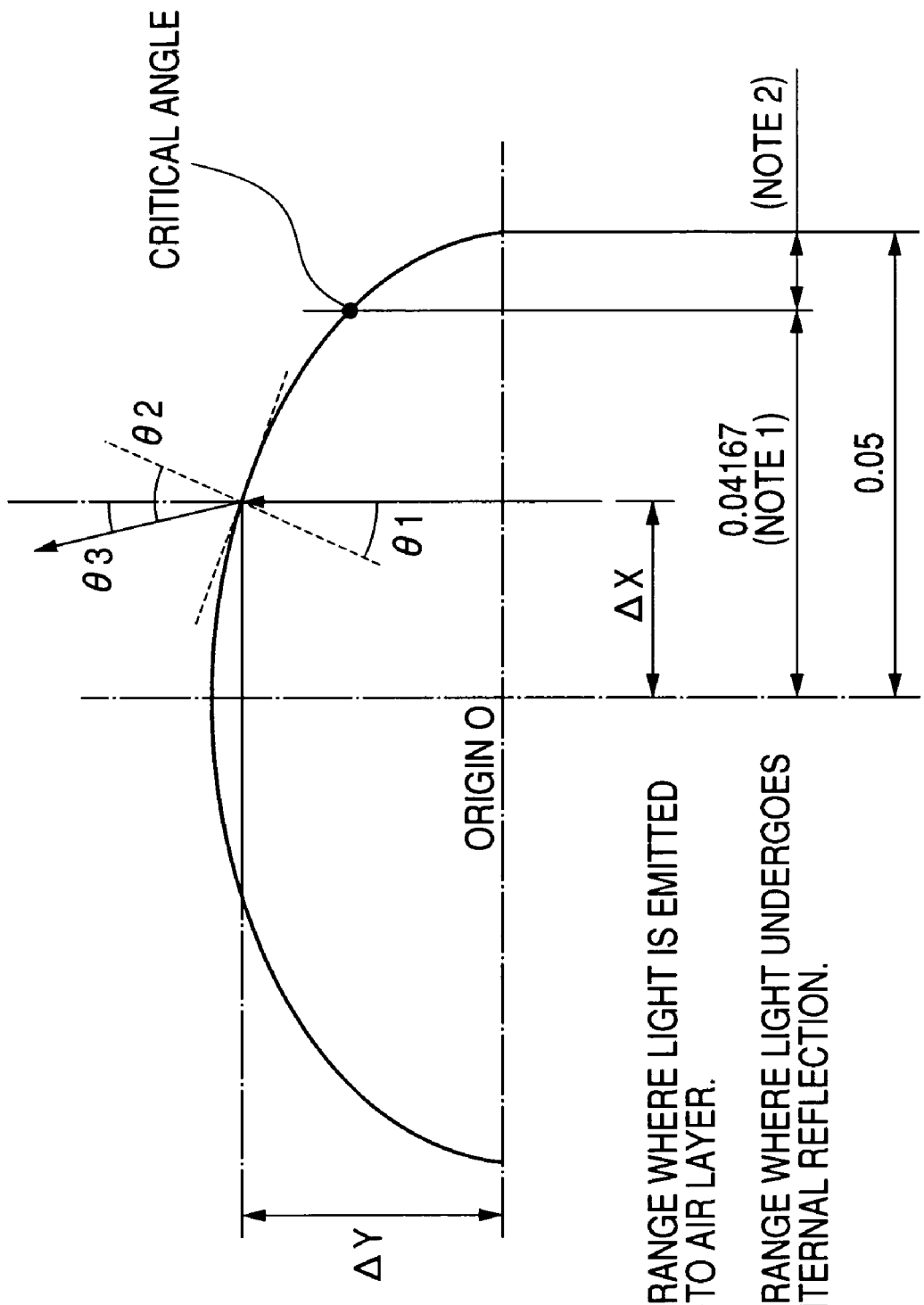

For example, the amount of the light emerging perpendicularly to the optical plate is reduced and the surplus light can be irradiated in various directions by disposing, on the high-brightness portions of the transparent optical plate 30, the minute optical controlling elements 31 having a circular arc cross section as shown in FIG. 9A, a parabolic arc cross section as shown in FIG. 9B, an elliptic arc cross section as shown in FIG. 9C, a cosine arc cross section as shown in FIG. 9D or the like.

Figure 10:
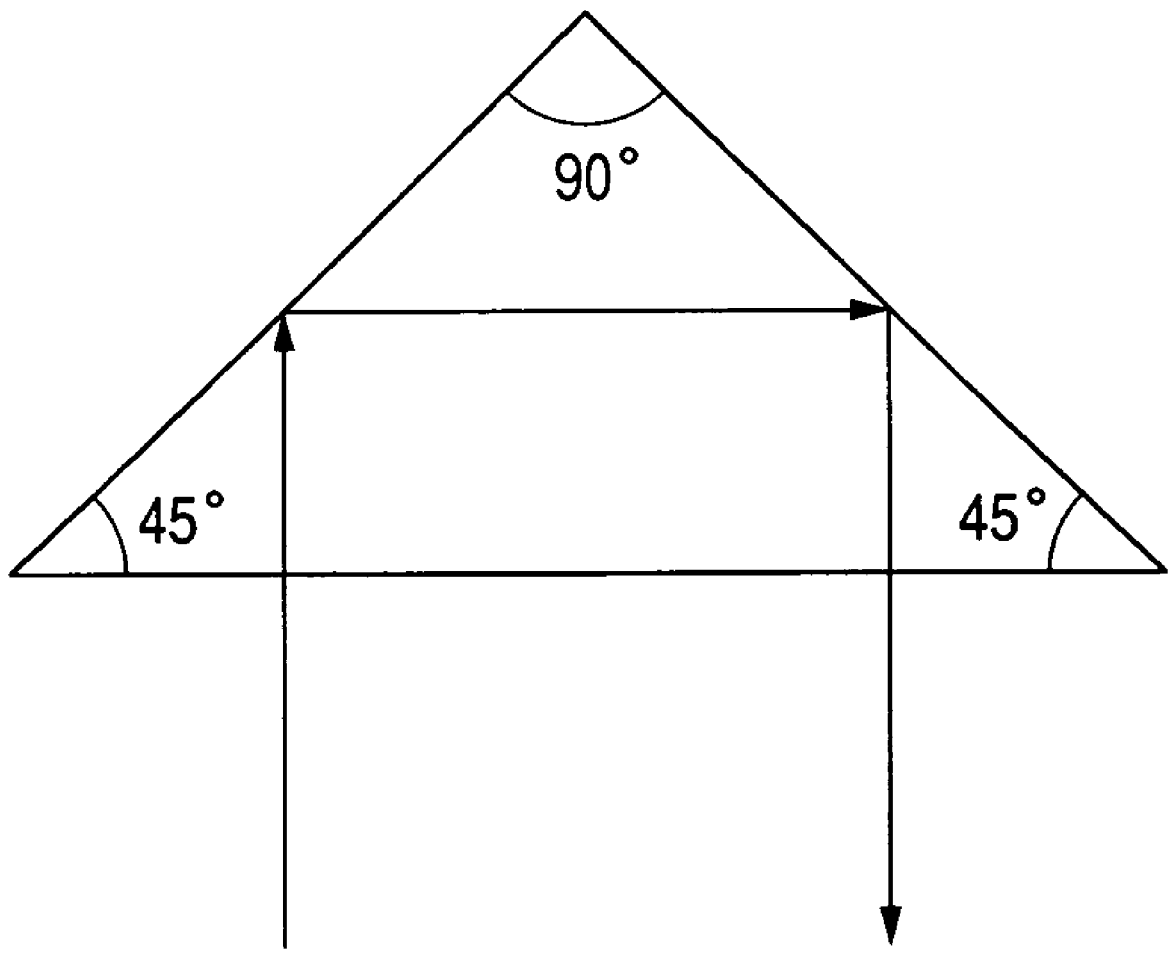
FIG. 10 is a cross-sectional view of a major portion of another example of a minute optical controlling element in accordance with the present invention for eliminating a difference in brightness level.
Figure 11:
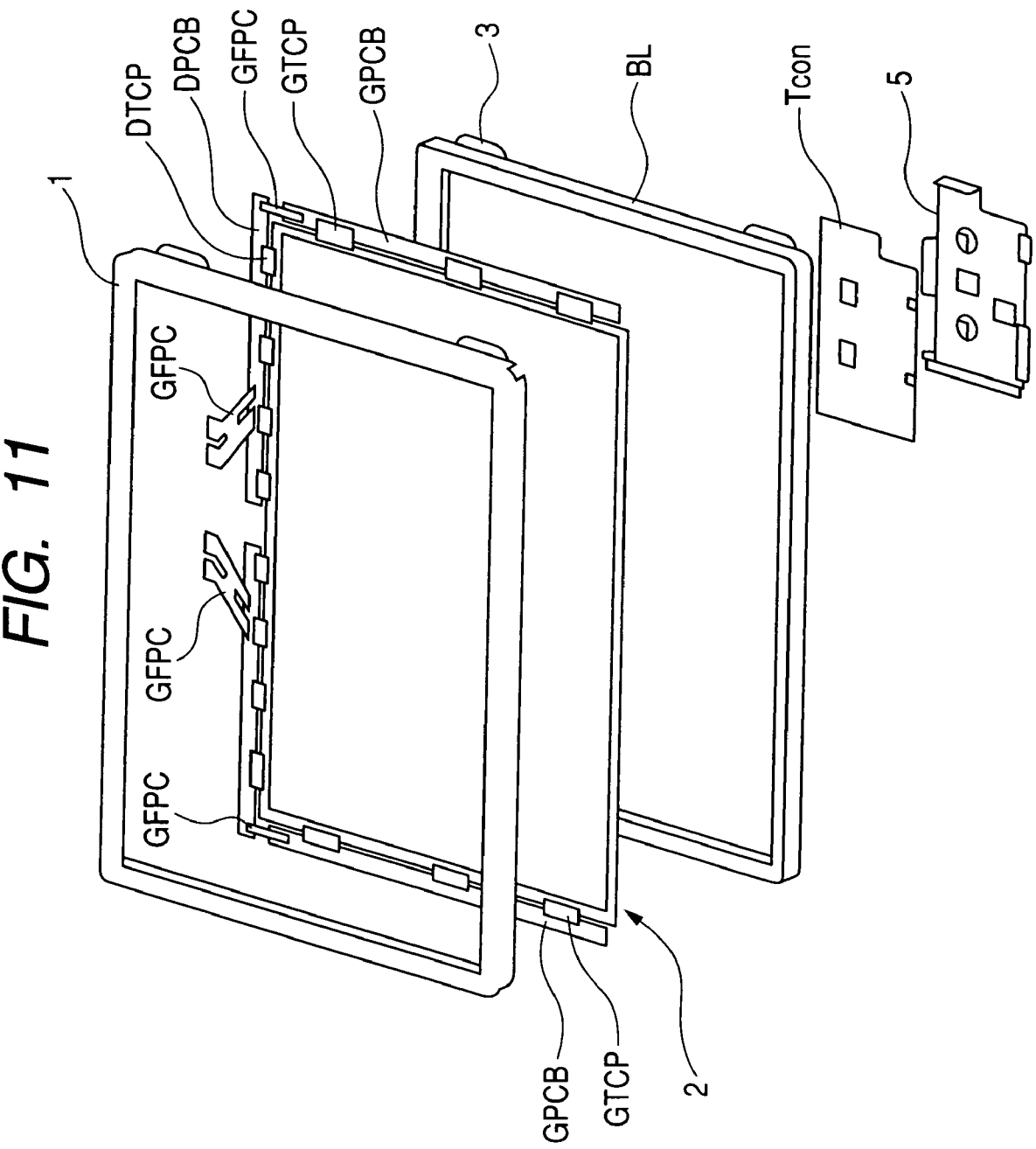
FIG. 11 is an exploded perspective view illustrating a rough configuration of a liquid crystal display module.

The above configuration makes it possible to control the difference in brightness level over the transparent optical plate 30. Further, the emerging angles of light rays can be controlled by provision of the minute optical controlling elements 31 having an equilateral triangular cross section as shown in FIG. 10.

In the above description, the present invention has been explained by taking acrylic (polymethylmethaacrylate; PMMA) as an example of material for the transparent optical plate 30, and it is needless to say that other transparent optical plates can be utilized for the present invention. Materials other than acrylic include polycarbonate (PC), polycycloolefin and the like. However, in a case where the transparent optical plate 30 made of these materials are used, the configuration of the minute optical controlling elements 31 needs to be designed by taking into account the difference in refractive index between these materials and acrylic. Further, initially the minute optical controlling elements 31 made of one material can be fabricated separately from the transparent optical plate 30 body of another material, and then the minute optical controlling elements 31 and the transparent optical plate 30 body are fixed together by using ultraviolet (UV)-curable resin.

As explained above, the present embodiment is capable of improving display brightness without using an expensive brightness-improving sheet, by providing the minute optical controlling elements 31 so that the light from the cold cathode fluorescent lamp CCFL emerges into the air layer from the upper surface of the transparent optical plate 30 perpendicularly to the optical plate 30 after directly entering the transparent optical plate 30 and passing therethrough.

The utilization coefficient of the light and uniformity in display brightness can be improved by selecting the controlling-element wall surface angle $\alpha f$ of the minute optical controlling elements 31 to be equal to an incident angle at which the light ray emerging from the cold cathode fluorescent lamp CCFL enters the minute optical controlling elements 31, or to be an angle that makes a light ray from an adjacent cold cathode fluorescent lamp CCFL emerge from the transparent optical plate 30 perpendicularly to the optical plate 30.

Further, by disposing a conventional light diffusing sheet on a liquid-crystal-display-panel side of the transparent optical plate 30, uniformity in brightness and viewing-angle characteristics can be improved over the conventional direct-light type backlight. The reason for this is that the emerging angles at which light rays from the transparent optical plate 30 are approximately 90° with respect to the optical plate 30, and that acrylic beads or the like within the light diffusing sheet diffuse the light in various directions.

While the optical components of the conventional direct-light type backlight are four to six in number, including a milk-white light diffusing plate, light diffusing sheets, a brightness improving sheet and the like, the optical components of the present embodiment are two in number, including the transparent optical plate 30 and a light diffusing sheet, or are three in number, further including another light diffusing sheet, and consequently, the present embodiment is capable of reducing the cost of the optical components sharply.

Further, since the present embodiment can reduce the number of the components to half or less, the present embodiment is capable of improving reliability.

Although the invention made by the present inventors has been explained concretely by using the above embodiments, the present invention is not limited to the above embodiment, and it will be obvious to those skilled in the art that various changes and modifications can be made without from the nature and the spirit of the present invention.

What is claimed is:

1. A liquid crystal display device comprising a liquid crystal display panel and a backlight disposed on a side of said liquid crystal display panel opposite from a display screen of said liquid crystal display panel;
   wherein said backlight comprises:
   a plurality of line light sources arranged in parallel with each other;
   a transparent optical plate disposed on a side of said plurality of line light sources facing toward said liquid crystal display panel; and
   a plurality of minute optical controlling elements formed on a surface of said transparent optical plate facing toward said liquid crystal display panel;
   wherein said plurality of minute optical controlling elements extend in parallel with said plurality of line light sources, and said plurality of minute optical controlling elements are symmetrical in a cross section perpendicular to longitudinal axes of said plurality of line light sources, between two adjacent midplanes each of which passes midway between two adjacent ones of said plurality of line light sources and each of which is perpendicular to said transparent optical plate;
   wherein said transparent optical plate is formed of a material having a total luminous transmittance in a range of 90% to 100%;
   wherein each of said plurality of minute optical controlling elements has a triangular cross section in said cross section perpendicular to said longitudinal axes of said plurality of line light sources;
   wherein let $\alpha f$ be an angle between said liquid-crystal-display-panel-side surface of said transparent optical plate and a first oblique side of said triangular cross section of each of said minute optical controlling elements closer to a plane of symmetry of said minute optical controlling elements formed between said two adjacent midplanes;
   wherein let $\theta f$ be an angle between said liquid-crystal-display-panel-side surface of said transparent optical plate and a second oblique side of said triangular cross section farther from said plane of symmetry; and
   wherein said plurality of minute optical controlling elements between said two adjacent midplanes have $\alpha f$ of a fixed value and $\theta f$ increasing with increasing distance from said plane of symmetry.

2. A liquid crystal display device according to claim 1, wherein said backlight further comprises a light diffusing sheet on a side of said transparent optical plate facing toward said liquid crystal display panel.

3. A liquid crystal display panel according to claim 1, wherein said backlight further comprises a reflective plate disposed on a side of said plurality of line light sources opposite from said liquid crystal display panel.

4. A liquid crystal display device according to claim 1, wherein said transparent optical plate enables both of uniform brightness and collection of light and is formed of the material having the total luminous transmittance in the range of 90% to 100% without diffusing agents therein.

5. A liquid crystal display device comprising a liquid crystal display panel and a backlight disposed on a side of said liquid crystal display panel opposite from a display screen of said liquid crystal display panel;
   wherein said backlight comprises:
   a plurality of line light sources arranged in parallel with each other;
   a transparent optical plate disposed on a side of said plurality of line light sources facing toward said liquid crystal display panel; and
   a plurality of minute optical controlling elements formed on a surface of said transparent optical plate facing toward said liquid crystal display panel;
   wherein said plurality of minute optical controlling elements extend in parallel with said plurality of line light sources, and said plurality of minute optical controlling elements are symmetrical in a cross section perpendicular to longitudinal axes of said plurality of line light sources, between two adjacent midplanes each of which passes midway between two adjacent ones of said plurality of line light sources and each of which is perpendicular to said transparent optical plate;
   wherein said transparent optical plate is formed of a material having a total luminous transmittance in a range of 90% to 100%;
   wherein each of said plurality of minute optical controlling elements has a triangular cross section in said cross section perpendicular to said longitudinal axes of said plurality of line light sources;
   wherein said plurality of minute optical controlling elements are formed with a specified arrangement pitch on said surface of said transparent optical plate facing toward said liquid crystal display panel;
   wherein let $\alpha f$ be an angle between said liquid-crystal-display-panel-side surface of said transparent optical plate and a first oblique side of said triangular cross section of each of said minute optical controlling elements closer to a plane of symmetry of said minute optical controlling elements formed between said two adjacent midplanes;
   wherein let $\theta f$ be an angle between said liquid-crystal-display-panel-side surface of said transparent optical plate and a second oblique side of said triangular cross section farther from said plane of symmetry; and
   wherein said plurality of minute optical controlling elements between said two adjacent midplanes have $\alpha f$ decreasing with increasing distance from said plane of symmetry and $\theta f$ increasing with increasing distance from said plane of symmetry.

6. A liquid crystal display device according to claim 5, wherein said backlight further comprises a light diffusing sheet on a side of said transparent optical plate facing toward said liquid crystal display pane.

7. A liquid crystal display panel according to claim 5, wherein said backlight further comprises a reflective plate disposed on a side of said plurality of line light sources opposite from said liquid crystal display panel.

8. A liquid crystal display device comprising a liquid crystal display panel and a backlight disposed on a side of said liquid crystal display panel opposite from a display screen of said liquid crystal display panel;
   wherein said backlight comprises:
      a plurality of line light sources arranged in parallel with each other;
      a transparent optical plate disposed on a side of said plurality of line light sources facing toward said liquid crystal display panel; and
      a plurality of minute optical controlling elements attached to a surface of said transparent optical plate facing toward said liquid crystal display panel;
   wherein said plurality of minute optical controlling elements extend in parallel with said plurality of line light sources; and said plurality of minute optical controlling elements are symmetrical in a cross section perpendicular to longitudinal axes of said plurality of line light sources, between two adjacent midplanes each of which passes midway between two adjacent ones of said plurality of line light sources and each of which is perpendicular to said transparent optical plate;
   wherein said transparent optical plate is formed of a material having a total luminous transmittance in a range of 90% to 100%;
   wherein each of said plurality of minute optical controlling elements has a triangular cross section in said cross section perpendicular to said longitudinal axes of said plurality of line light sources;
   wherein let $\alpha f$ be an angle between said liquid-crystal-display-panel-side surface of said transparent optical plate and a first oblique side of said triangular cross section of each of said minute optical controlling elements closer to a plane of symmetry of said minute optical controlling elements formed between said two adjacent midplanes;
   wherein let $\theta f$ be an angle between said liquid-crystal-display-panel-side surface of said transparent optical plate and a second oblique side of said triangular cross section farther from said plane of symmetry; and
   wherein said plurality of minute optical controlling elements between said two adjacent midplanes have $\alpha f$ of a fixed value and $\theta f$ increasing with increasing distance from said plane of symmetry.

9. A liquid crystal display device according to claim 8, wherein said transparent optical plate enables both of uniform brightness and collection of light and is formed of the material having the total luminous transmittance in the range of 90% to 100% without diffusing agents therein.

10. A liquid crystal display device according to claim 8, wherein said backlight further comprises a light diffusion sheet on a side of said transparent optical plate facing toward said liquid crystal display panel.

11. A liquid crystal display device according to claim 8, wherein said backlight further comprises a reflective plate disposed on a side of said plurality of line light sources opposite from said liquid crystal display panel.

* * * * *